(12) United States Patent
Foitzik et al.

(10) Patent No.: US 9,033,428 B2
(45) Date of Patent: May 19, 2015

(54) CONTROL DEVICE FOR A BRAKING SYSTEM OF A VEHICLE, BRAKING SYSTEM FOR A VEHICLE, AND METHOD FOR OPERATING A BRAKING SYSTEM OF A VEHICLE

(71) Applicants: Bertram Foitzik, Ilsfeld (DE); Ryan Kuhlman, Novi, MI (US); Edward Heil, Brighton, MI (US); Christian Binder, Neckarsulm (DE)

(72) Inventors: Bertram Foitzik, Ilsfeld (DE); Ryan Kuhlman, Novi, MI (US); Edward Heil, Brighton, MI (US); Christian Binder, Neckarsulm (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 13/687,297

(22) Filed: Nov. 28, 2012

(65) Prior Publication Data

US 2013/0134771 A1 May 30, 2013

(30) Foreign Application Priority Data

Nov. 29, 2011 (DE) .......................... 10 2011 087 311

(51) Int. Cl.
| | |
|---|---|
| *B60T 8/17* | (2006.01) |
| *B60T 7/04* | (2006.01) |
| *B60T 8/40* | (2006.01) |
| *B60T 8/88* | (2006.01) |
| *B60T 13/66* | (2006.01) |
| *B60T 13/68* | (2006.01) |

(52) U.S. Cl.
CPC . *B60T 8/17* (2013.01); *B60T 7/042* (2013.01); *B60T 8/409* (2013.01); *B60T 8/885* (2013.01); *B60T 13/662* (2013.01); *B60T 13/686* (2013.01); *B60T 2270/402* (2013.01); *B60T 8/4081* (2013.01)

(58) Field of Classification Search
CPC ....... B60T 8/4081; B60T 7/042; B60T 8/409; B60T 2270/82; B60T 2270/60; B60T 8/17; B60T 8/885; B60T 13/662; B60T 13/686
See application file for complete search history.

(56) References Cited

U.S. PATENT DOCUMENTS

| | | | | | |
|---|---|---|---|---|---|
| 4,462,642 | A | * | 7/1984 | Leiber | 303/113.4 |
| 5,727,851 | A | * | 3/1998 | Ohkubo et al. | 303/117.1 |
| 6,164,734 | A | * | 12/2000 | Otomo et al. | 303/122.1 |
| 6,341,947 | B1 | * | 1/2002 | Otomo | 417/286 |
| 6,464,307 | B1 | * | 10/2002 | Yoshino | 303/11 |
| 6,517,170 | B1 | * | 2/2003 | Hofsaess et al. | 303/11 |

(Continued)

FOREIGN PATENT DOCUMENTS

DE    10 2007 030 441    1/2009

*Primary Examiner* — Thomas J Williams
*Assistant Examiner* — Mariano Sy
(74) *Attorney, Agent, or Firm* — Kenyon & Kenyon LLP

(57) ABSTRACT

A control device for a braking system of a vehicle is provided, having a first receiving device which receives a provided brake activation intensity variable, a plunger control device which determines a setpoint fill level variable of a plunger, taking into account at least the received brake activation intensity variable, and a corresponding plunger control signal is outputtable so that a ratio of an actual volume and a maximum fillable volume of a storage volume of the plunger is settable corresponding to the determined setpoint fill level variable. For a brake activation intensity variable corresponding to a predefined non-activation intensity variable, the plunger control device determines a fill level variable different from an empty state as the setpoint fill level variable, and outputs a plunger control signal corresponding to the determined setpoint fill level variable to the plunger such that the plunger is at least partially filled.

18 Claims, 11 Drawing Sheets

(56) References Cited

U.S. PATENT DOCUMENTS

| | | | |
|---|---|---|---|
| 6,655,751 B2* | 12/2003 | Nakano | 303/11 |
| 6,860,569 B1* | 3/2005 | Campau et al. | 303/11 |
| 2004/0207252 A1* | 10/2004 | Woll | 303/113.1 |
| 2005/0162008 A1* | 7/2005 | Bickel et al. | 303/113.4 |
| 2007/0126282 A1* | 6/2007 | Hwang | 303/10 |
| 2008/0010985 A1* | 1/2008 | Miyazaki et al. | 60/565 |
| 2011/0025121 A1* | 2/2011 | Yang et al. | 303/15 |

\* cited by examiner

CONTROL DEVICE FOR A BRAKING SYSTEM OF A VEHICLE, BRAKING SYSTEM FOR A VEHICLE, AND METHOD FOR OPERATING A BRAKING SYSTEM OF A VEHICLE

CROSS REFERENCE TO RELATED APPLICATION

The present application claims priority to Application No. DE 10 2011 087 311.2, filed in the Federal Republic of Germany on Nov. 29, 2011, which is expressly incorporated herein in its entirety by reference thereto.

FIELD OF INVENTION

The present invention relates to a control device for a braking system of a vehicle. Moreover, the present invention relates to a braking system for a vehicle. Furthermore, the present invention relates to a method for operating a braking system of a vehicle.

BACKGROUND INFORMATION

German Application No. DE 10 2007 030 441 describes a braking system for a motor vehicle having a generator, and a corresponding method for operating a braking system having a generator. To maintain an overall braking torque predefined by a driver of the motor vehicle, despite variation over time of a generator braking torque exerted by the generator, a simulator unit is to be activated in such a way that a volume of hydraulic fluid which corresponds to the difference in the generator braking torque is displaced between the braking system and at least one storage chamber of the simulator unit. In this way, a standard braking feel for the driver is to be ensurable despite the variation of the generator braking torque over time.

SUMMARY

The present invention provides a control device for a braking system of a vehicle, a braking system for a vehicle, and a method for operating a braking system of a vehicle.

As described in greater detail below, a free travel of the brake activation element which typically occurs when the plunger is functionally impaired may be at least reduced by determining a fill level of the plunger, taking the activation intensity into account. With the aid of the present invention, the driver is thus able to quickly and reliably brake the at least one wheel brake caliper of the braking system despite the functional impairment of the plunger. This ensures better driving comfort for the driver.

In the present invention, the costs for the shutoff valve are eliminated. Compared to a conventional blending device for intermediate storage of liquid, using a shutoff valve, a plunger which is operated with the aid of the present invention ensures that it is not necessary to ascertain a defect of the shutoff valve which has possibly occurred. Likewise, there is no risk that, due to the failure to recognize a defective shutoff valve, a large free travel at the brake activation element must be overcome before a pressure buildup may be started in the at least one wheel brake caliper.

Likewise, with the present invention it is not necessary to ascertain a functional impairment of a shutoff mechanism, for example a wrap spring. With the present invention it is likewise not necessary to accept the occurrence of a comparatively large free travel in the event of an engine failure and/or a defective shutoff mechanism.

Furthermore, with the aid of the present invention a self-locking gear on the plunger may be spared. By increasing the efficiency of the gear of the plunger, which has a nonself-locking design, the plunger motor may have a less expensive design which requires less installation space. In addition, due to the reduced effort which must be expended by the motor for operating the gear of the plunger having a nonself-locking design, the energy consumption of the plunger and pollutant emissions of the vehicle thus equipped may be reduced.

The present invention thus ensures a cost-effective and energy-efficient design of a plunger of a braking system. With the aid of the present invention it is also possible to implement a plunger having an energy-efficient gear without having to provide additional shutoff mechanisms or other safety requirements on the plunger.

BRIEF DESCRIPTION OF THE DRAWINGS

Further features and advantages of exemplary embodiments of the present invention are explained below with reference to the accompanying drawings.

DETAILED DESCRIPTION

Figure 1:
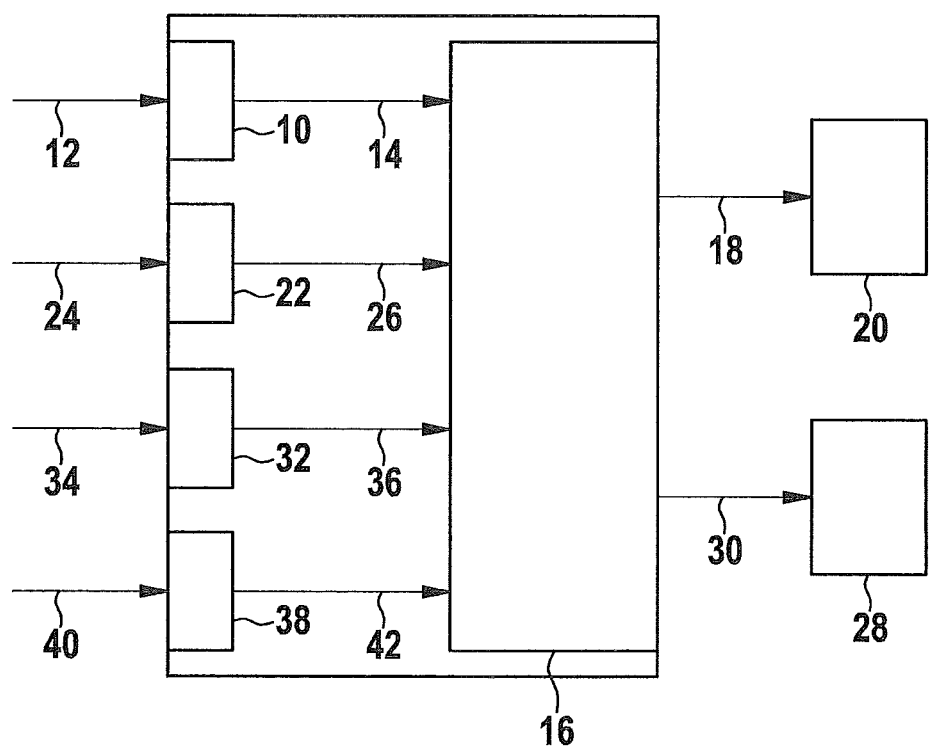
FIG. 1 shows a schematic illustration of one exemplary embodiment of the control device.

FIG. 1 shows a schematic illustration of one exemplary embodiment of the control device.

The control device schematically illustrated in FIG. 1 is usable in a braking system of a vehicle. One possible design of the usable braking system is addressed in greater detail in the description of the following figures.

The control device has a first receiving device 10 with the aid of which a brake activation intensity signal 12 concerning an activation intensity of an activation of a brake activation element provided on the braking system is receivable. A brake activation intensity variable 14 corresponding to brake activation intensity signal 12 is providable with the aid of first receiving device 10. Brake activation intensity variable 14 may include a braking distance, a braking force, and/or a brake pressure, for example. However, providable brake activation intensity variable 14 is not limited to the examples listed here.

The control device also has a plunger control device 16 with the aid of which a setpoint fill level variable of a plunger is determinable, taking into account at least received brake activation intensity variable 14. The determinable setpoint fill level variable may be understood to mean a setpoint ratio of a volume of liquid that is filled into a storage volume of the plunger and a maximum volume that is fillable into the storage volume. The determinable setpoint fill level variable may be, for example, a fill level of the plunger and/or a setpoint volume of the liquid that is filled into the storage volume of the plunger. Similarly, a volume capacity which is still fillable into the storage volume of the plunger is determinable as the setpoint fill level variable. Likewise, the determinable setpoint fill level variable may describe a position of a displaceable piston component/piston of the plunger and/or a position/a rotation angle of a gear/motor of the plunger. However, the determinable setpoint fill level variable is not limited to the examples listed here.

A plunger control signal 18 corresponding to the determined setpoint fill level variable is outputtable to a plunger 20 with the aid of plunger control device 16. Plunger 20 is preferably controllable with the aid of plunger control signal 18 in such a way that an actual ratio of the volume of liquid that is filled into the storage volume of plunger 20 and the maximum volume that is fillable into the storage volume is settable corresponding to the determined setpoint fill level variable.

In addition, for a brake activation intensity variable 14 corresponding to a predefined non-activation intensity variable, plunger control device 16 is designed to determine a fill level variable which differs from an empty state of plunger 20 as the setpoint fill level variable, and to output a plunger control signal 18 corresponding to the determined setpoint fill level variable to plunger 20 in such a way that plunger 20 is at least partially filled, despite brake activation intensity variable 14 being equal to the non-activation intensity variable. This may be understood in such a way that for a brake activation intensity variable 14 corresponding to the predefined non-activation intensity variable, a fill level variable corresponding to a volume of the liquid, not equal to zero, that is filled into the storage volume of the plunger is determinable as the setpoint fill level variable. Similarly, also for a brake activation intensity variable 14 corresponding to the predefined non-activation intensity variable, a position of the displaceable piston component/piston of the plunger and/or a position/a rotation angle of the gear/motor of the plunger, in which the storage volume of the plunger is at least partially filled, is determinable as the setpoint fill level variable. Likewise, a volume capacity which is determinable as the setpoint fill level variable for a brake activation intensity variable 14 corresponding to the predefined non-activation intensity variable and which is still fillable into the storage volume of the plunger may be less than 100%.

A brake activation intensity variable, in the event that the brake activation element is not activated or the brake activation element is in its starting position/non-activation position, may be understood as the non-activation intensity variable. In particular, the non-activation intensity variable may be a brake activation intensity variable that is equal to zero.

For example, for a brake activation intensity variable 14 corresponding to the non-activation intensity variable, plunger control device 16 may be designed to determine a fill level variable of at least 20% as the setpoint fill level variable, and to output a plunger control signal 18 corresponding to the determined fill level variable to plunger 20 in such a way that the actual volume of liquid that is filled into the storage volume is settable to at least 20% of the maximum volume. Thus, when the driver refrains from activating the brake activation element, plunger 20 is controllable by the control device in such a way that the actual volume of liquid that is filled into the storage volume is settable to at least 20% of the maximum volume. In other words, if activation of the brake activation element is dispensed with, an actual ratio of the volume of liquid that is filled into the storage volume of plunger 20 and the maximum volume of at least 20% that is fillable into the storage volume is settable.

For a brake activation intensity variable 14 corresponding to the non-activation intensity variable, plunger control device 16 is preferably designed to determine a fill level variable of at least 50% as the setpoint fill level variable in such a way that the actual volume of liquid that is filled into the storage volume is settable to at least 50% of the maximum volume. In this case, a plunger control signal 18 corresponding to the determined fill level variable is also outputtable to plunger 20. This may be understood in such a way that, for a brake activation intensity variable 14 corresponding to the predefined non-activation intensity variable, a fill level variable corresponding to a volume of the liquid, which is at least 50% of the maximum volume, that is filled into the storage volume of the plunger is determinable as the setpoint fill level variable. Similarly, also for a brake activation intensity variable 14 corresponding to the predefined non-activation intensity variable, a position of the displaceable piston component/piston of the plunger and/or a position/a rotation angle of the gear/motor of the plunger, in which the storage volume of the plunger is filled to at least 50%, is determinable as the setpoint fill level variable. Likewise, a volume capacity which is determinable as the setpoint fill level variable for a brake activation intensity variable 14 corresponding to the predefined non-activation intensity variable and which is still fillable into the storage volume of the plunger may be at most 50%.

By filling the storage volume of plunger 20 to at least 50% when the brake activation element is in its starting position/non-activation position, it may yield that a comparatively large quantity of liquid is filled into the storage volume of plunger 20, even before an activation of the brake activation element by the driver. Complete filling of plunger 20, which is already prefilled to at least 50%, thus requires a much smaller quantity of brake fluid than for an empty plunger device having the same maximum volume. For plunger 20 which is already prefilled to at least 50%, if a functional impairment of at least one component of plunger 20 occurs, for example a functional impairment of a motor and/or of a closing component of plunger 20, as the result of which control of the filling of brake fluid when there is a pressure rise in the braking system is no longer ensured, only a comparatively small volume of brake fluid is nevertheless pressed into plunger 20 before it is completely filled, and further filling of plunger 20 is thus impossible. In contrast, for a comparable functional impairment of a component of an empty plunger device having an equal maximum volume, a significantly larger volume of brake fluid is undesirably pressed into the plunger device.

As a rule, dispensing with the option for controlling the filling of brake fluid into a plunger device results in undesired displacement of brake fluid into the plunger device for a comparatively long period of time, thus significantly increasing the free travel the driver must overcome when activating the brake activation element. In other words, when the option for controlling the filling of brake fluid into the plunger device is dispensed with, the driver must initially displace a comparatively large amount of brake fluid into the plunger device by activating the brake activation element before (after overcoming the free travel) he brings about a brake pressure buildup in the at least one wheel brake caliper. In contrast, prefilling plunger 20 to at least 50% has the advantage that, even if there is a functional impairment of at least one component of plunger 20, plunger 20 is completely filled comparatively quickly, and the driver is thus able to bring about a buildup of the brake pressure early in the at least one wheel brake caliper by activating the brake activation element.

By prefilling plunger 20 to at least 20%, use may be made of its advantages, in particular compared to a pump, for example its usability for additional filling of the at least one wheel brake caliper without occurrence of pulsations, without having to accept the delay in buildup of the brake pressure in the at least one wheel brake caliper which typically occurs when at least one of the components of the plunger malfunctions.

Further advantages of plunger 20, which is already filled at least to 50% before the brake activation element is activated, are described in greater detail below.

In one preferred exemplary embodiment, for a brake activation intensity variable 14 corresponding to the non-activation intensity variable, plunger control device 16 may be designed to determine a fill level variable of at least 70%, preferably at least 90%, preferably at least 97%, in particular 100% (of the maximum volume), as the setpoint fill level variable. In particular in the latter case, undesired filling of plunger 20 when at least one of its components malfunctions during the initial activation of the brake activation element is (essentially) prevented. Thus, as the result of eliminating the option of controlling the filling of brake fluid into the plunger, activation of the brake activation element subsequent to the elimination causes little or no undesired displacement of the brake fluid, expelled from a master brake cylinder of the braking system, into plunger 20 (instead of the at least one wheel brake caliper), and thus, little or no delay in the buildup of brake pressure in the at least one wheel brake caliper until plunger 20 is completely filled. In other words, even if at least one component of plunger 20 is functionally impaired, the driver has to overcome little or no free travel before plunger 20 is completely filled, and thus, a buildup of brake pressure in the at least one wheel brake caliper may be started with the aid of the brake fluid expelled from the master brake cylinder. Due to the advantageous controlling of plunger 20 with the aid of the control device, the occurrence of an undesired free travel when at least one component of plunger 20 is functionally impaired is thus preventable.

For a brake activation intensity variable 14 between the non-activation intensity variable and a predefined first limiting activation intensity variable, plunger control device 16 may in particular be designed to determine the setpoint fill level variable as a continuously decreasing function of brake activation intensity variable 14/the brake activation intensity. In addition, for a brake activation intensity variable 14 between a predefined second limiting activation intensity variable, which is greater than or equal to the first limiting activation intensity variable, and a predefined third limiting activation intensity variable, plunger control device 16 may also determine the setpoint fill level variable as a continuously increasing function of the brake activation intensity variable. The advantages of this type of design of plunger control device 16 are described in greater detail below.

In one preferred exemplary embodiment, the control device also includes a second receiving device 22, with the aid of which a provided blending variable signal 24 concerning a change over time of a braking torque to be blended is receivable. A blending variable 26 corresponding to blending variable signal 24 is subsequently providable to plunger control device 16 with the aid of second receiving device 22. In this case, plunger control device 16 is advantageously also designed to reduce the setpoint fill level variable when the braking torque to be blended decreases over time. When there is a decrease over time of the braking torque to be blended, the setpoint fill level variable is preferably redeterminable with the aid of plunger control device 16 in such a way that, due to the reduction of the actual fill level of controlled plunger 20, a volume of brake fluid is transferrable into the at least one wheel brake caliper, which increases the hydraulic braking torque of the at least one wheel brake caliper by a difference which corresponds to the decrease over time of the braking torque to be blended. As the result of plunger 20 being controlled by the control device, an overall braking torque predefined by the driver may thus be reliably maintained despite the decrease over time of the braking torque to be blended.

Furthermore, plunger control device 16 may also be designed to increase the setpoint fill level variable when there is an increase over time of the braking torque to be blended. When there is an increase over time of the braking torque to be blended, the setpoint fill level variable is advantageously redetermined with the aid of plunger control device 16 in such a way that, due to the increased actual fill level of controlled plunger 20, a volume of brake fluid may be drawn from the at least one wheel brake caliper into the storage volume, which reduces the hydraulic braking torque of the at least one wheel brake caliper by a difference which corresponds to the increase over time of the braking torque to be blended. Thus, plunger 20 may also be used to compensate for the increase over time of the braking torque to be blended. Alternatively, plunger control device 16 may be designed to determine a setpoint intake volume of a storage chamber 28 corresponding to the increase over time of the braking torque to be blended, and to output a storage control signal 30, which corresponds to the setpoint intake volume, to an actuator unit of storage chamber 28. The advantages resulting from using storage chamber 28 for blending the increase over time are described in greater detail below.

The braking torque to be blended may in particular be a generator braking torque of a generator. With the aid of the control device, an overall vehicle deceleration predefined by a driver may thus be reliably maintained, despite the temporally varying usability of a generator due to a vehicle speed and/or a state of charge of a battery, and at the same time, frequent usability of the generator for quickly charging the battery is ensured. However, instead of a generator braking torque, other braking torques are blendable with the aid of the control device. Thus, the usability of the control device described here is not limited to a braking system equipped with a generator.

Optionally, a third receiving device 32 may be provided on the control device, with the aid of which a provided change of travel direction signal 34 concerning a change of direction of travel, for example due to an executed steering angle, of a vehicle equipped with the control device is receivable. In this case, with the aid of third receiving device 32, a change of travel direction variable 36 which corresponds to change of travel direction signal 34 is relayable to plunger control device 16. Plunger control device 16 may also be designed to compare change of travel direction variable 36 to at least one predefined comparative angle variable. After receiving a brake activation intensity variable 14 which differs from the non-activation intensity variable, plunger control device 16 may redetermine the setpoint fill level variable, also taking into account the comparison of change of travel direction variable 36 to the comparative angle variable. In particular, if change of travel direction variable 36 is less than the comparative angle variable, plunger control device 16 may determine a first fill level variable as the setpoint fill level variable, taking brake activation intensity variable 14 into account. If change of travel direction variable 36 is greater than the comparative angle variable, a second fill level variable which is less than the first fill level variable is advantageously determinable as the setpoint fill level variable with the aid of plunger control device 16, taking brake activation intensity variable 14 into account. As described in greater detail below, air play in a brake caliper which occurs when driving around a curve may be overcome by reducing the actual fill level of plunger 20, and as a result of the brake fluid which is thus additionally displaced into the braking system.

Alternatively or additionally, the control device may include a fourth receiving device 38, with the aid of which a provided plunger use intensity signal 40 concerning a duration and/or an intensity of a use of plunger 20 is receivable, and a use intensity variable 42 corresponding to plunger use intensity signal 40 is outputtable to plunger control device 16. In this case, plunger control device 16 is preferably also designed to compare use intensity variable 42 to at least one predefined comparative use variable. In this case as well, if a brake activation intensity variable 14 subsequently appears which differs from the non-activation intensity variable, the setpoint fill level variable may be redetermined, taking the comparison of use intensity variable 42 to the comparative use intensity variable into account. If use intensity variable 42 is less than the comparative use intensity variable, with the aid of plunger control device 16 a third fill level variable may be determinable as the setpoint fill level variable, taking brake activation intensity variable 14 into account. In contrast, if use intensity variable 42 is greater than the comparative use intensity variable, with the aid of plunger control device 16 a fourth fill level variable which is less than the third fill level variable may be determinable as the setpoint fill level variable, taking brake activation intensity variable 14 into account. As the result of reducing the actual fill level of plunger 20 when a use intensity variable 42 is greater than the comparative use intensity variable, signs of wear on the braking system may be compensated for by additionally filling the at least one wheel brake caliper. This is described in greater detail with reference to the following figures.

Figure 2A:
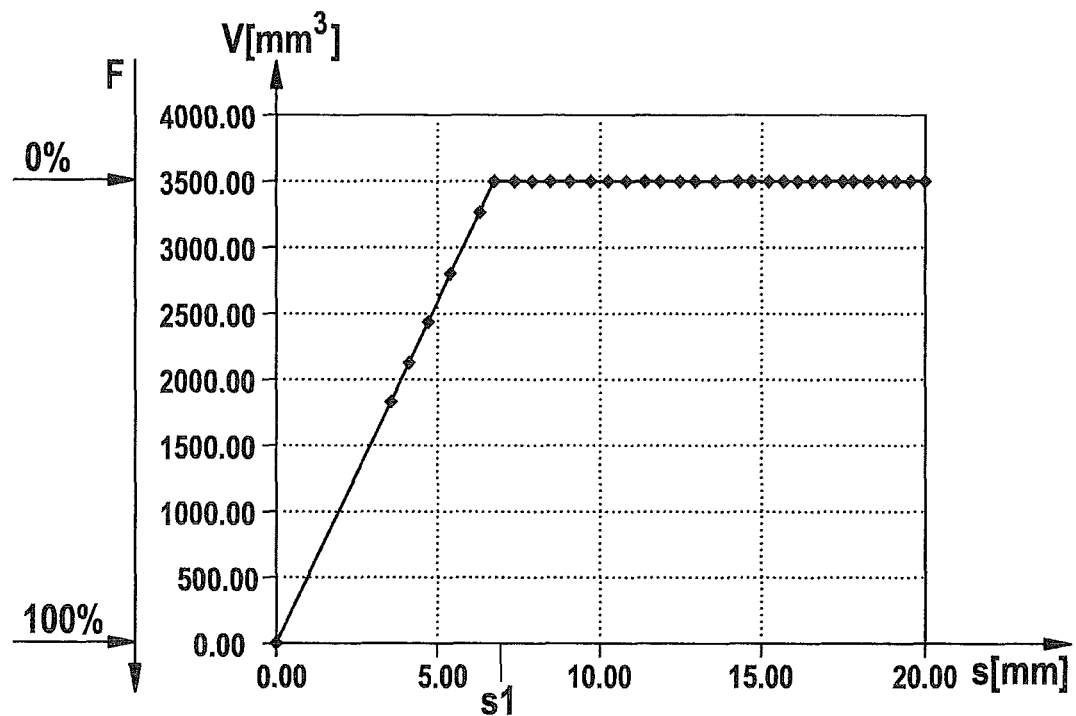
FIGS. 2a through 2c show three coordinate systems for explaining a first exemplary embodiment of the method for operating a braking system.
Figure 2B:
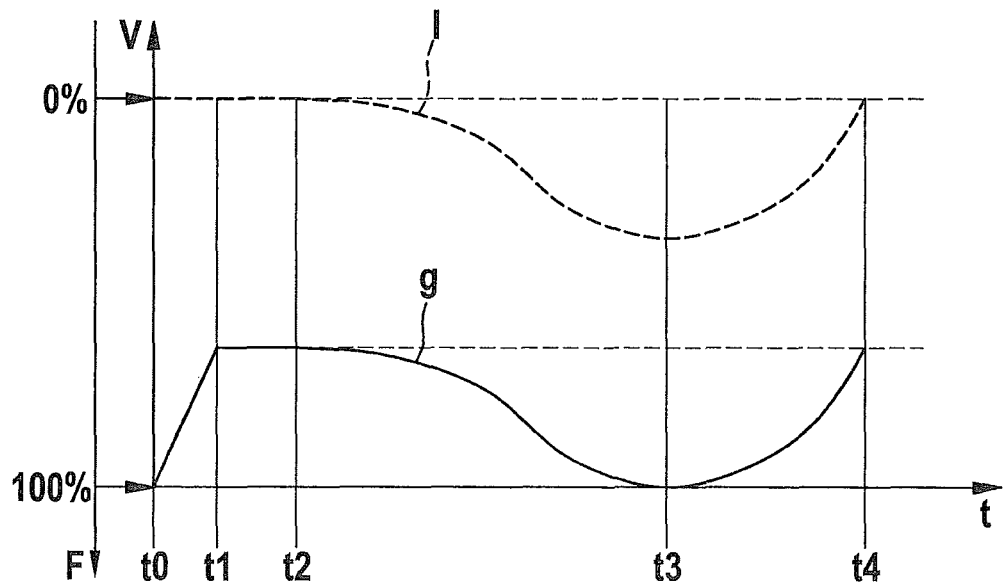
Figure 2C:
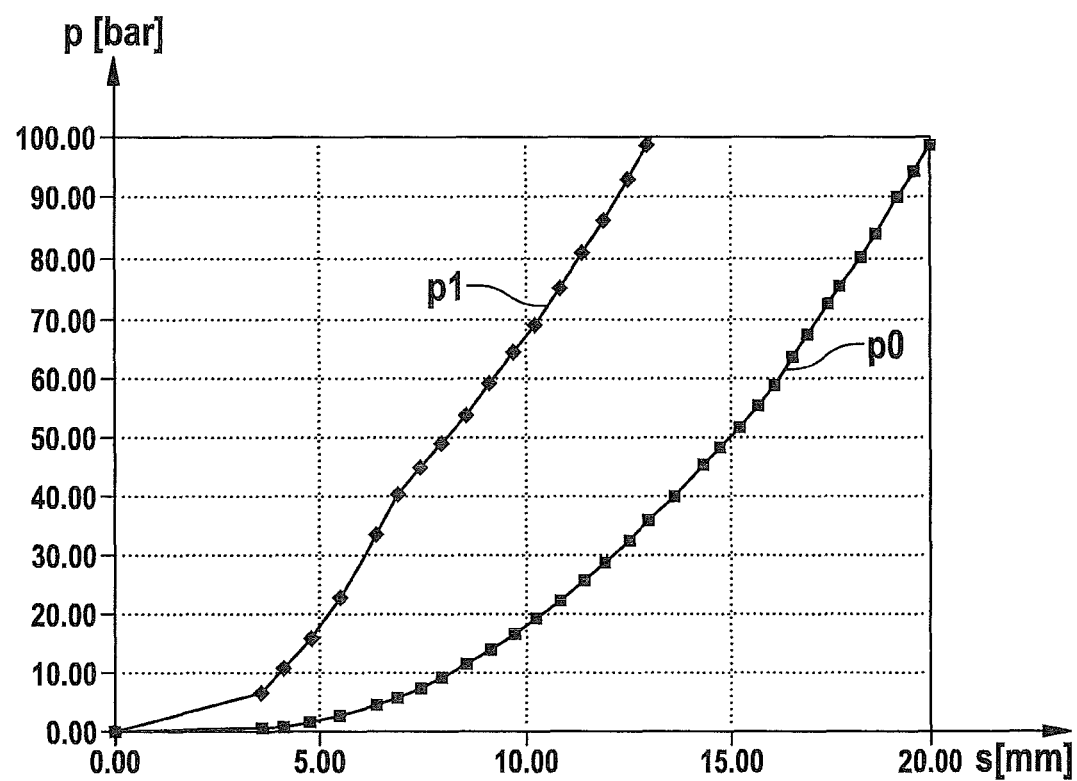

FIGS. 2a through 2c show three coordinate systems for explaining a first exemplary embodiment of the method for operating a braking system.

In carrying out the method, a setpoint fill level of a plunger is determined, taking into account at least one activation intensity of an activation of a brake activation element situated on the braking system. The plunger is subsequently controlled, corresponding to the determined setpoint fill level, in such a way that an actual ratio of a volume of liquid that is filled into the storage volume of plunger 20 and a maximum volume that is fillable into the storage volume is set corresponding to the determined setpoint fill level. This may also be described as setting an actual ratio of a volume of liquid that is filled into the storage volume and a (maximum fillable) maximum volume of a storage volume of the plunger, corresponding to the determined setpoint fill level. Examples of the determinable setpoint fill level and of the settable actual ratio have been described above.

The abscissa of the coordinate system in FIG. 2a indicates a brake activation distance s (input rod travel), in mm, by which the brake activation element is displaced during an activation by a driver. The ordinate of the coordinate system in FIG. 2a corresponds to actual fill level F (in %) which is set as a function of brake activation distance s with the aid of the method and a volume capacity V (in $mm^3$) that is still fillable into the storage volume for actual fill level F. Volume capacity V may also be referred to as the difference between the maximum volume and the volume of liquid that is already filled into the storage volume.

In carrying out the method, as the activation intensity, brake activation distance s is compared to a zero distance which is predefined as the non-activation intensity. If brake activation distance s is equal to zero, i.e., the brake activation intensity corresponds to the non-activation intensity, a setpoint fill level of at least 20%, for example of at least 50%, preferably of at least 70%, in particular of at least 90%, preferably of at least 95% (of the maximum volume), is determined. The plunger is subsequently controlled, corresponding to the determined setpoint fill level, in such a way that actual fill level F is preferably set equal to the setpoint fill level. In other words, at least one actual fill level F of at least 20%, for example of at least 50%, preferably of at least 70%, in particular of at least 90%, preferably of at least 95%, is set. In the illustrated exemplary embodiment, for a brake activation distance s equal to zero an actual fill level of 100%, or a volume capacity V equal to zero, is advantageously set. Thus, if components of the plunger fail, an undesired displacement of brake fluid into the plunger during an initial activation of the brake activation element is prevented despite a comparatively high pressure.

In the method, over a brake activation distance s between zero and a predefined first limiting brake activation distance s1, i.e., a brake activation intensity between the non-activation intensity and a predefined first limiting activation intensity, the setpoint fill level variable is determined as a continuously decreasing function of brake activation distance s/the brake activation intensity. Actual fill level F is preferably reduced over a brake activation distance s between zero and first limiting brake activation distance s1 in such a way that increased volume capacity V corresponds to the volume of brake fluid that is additionally filled into the at least one wheel brake caliper of the braking system for brake activation distance s (in comparison to a brake activation distance s equal to zero). In this way, it may yield that for a brake activation distance s between zero and first limiting brake activation distance s1, just enough brake fluid is fillable into the plunger so that the hydraulic braking torque of the at least one wheel brake caliper is reducible to zero. Over a brake activation distance s between zero and first limiting brake activation distance s1, it is thus always ensured that a non-hydraulic braking torque, such as a generator braking torque in particular, is blendable by reducing the hydraulic braking torque of the at least one wheel brake caliper. At the same time, it is ensured that, even if at least one component of the plunger malfunctions over a brake activation distance s between zero and first limiting brake activation distance s1, the driver only has to overcome a comparatively small free travel before the plunger is completely filled, and the driver is able to increase the brake pressure in the at least one wheel brake caliper by activating the brake activation element.

The procedure may also be described in such a way that, for an increasing deceleration input between zero and first limiting brake activation distance s1, the plunger pushes additional liquid into the braking system. This displaced brake fluid may be sufficient to blend a brake pressure of 24 bar (3 $m/s^2$), if necessary.

The plunger may also have a closing device with the aid of which, for a brake activation distance s starting at first limiting brake activation distance s1, actual fill level F, which is equal to 0%, is maintainable even against a comparatively high pressure. Since a suitable closing device is not the subject matter of the present invention, no further detailed information is provided.

The blending process is described once more with reference to FIG. 2b. The abscissa of the coordinate system in FIG. 2b is time axis t. The ordinate of the coordinate system in FIG. 2b indicates the actual fill level of the plunger (in %) and volume capacity V (in mm$^3$) that is fillable into the plunger. The advantageous method is depicted with the aid of graph g. (Dashed line 1 corresponds to a conventional operating strategy for operating a plunger.)

The plunger is already full before the brake activation element is activated by the driver at point in time t0. Therefore, the actual fill level is 100% prior to point in time t0. (In the conventional operating strategy depicted by dashed line 1, the plunger is completely emptied after each regenerative braking operation.)

The driver activates the brake activation element beginning at point in time t0. The blending start position of the plunger is refilled with increasing brake activation intensity (as a function of the level of the driver braking input) only after the activation of the brake activation element has begun. For this purpose, actual fill level F of the plunger is continuously reduced at point in time t1, when the brake activation intensity is equal to the predefined first limiting activation intensity. The plunger preferably pushes only enough brake fluid into the braking system as is needed for reducing the hydraulic braking torque of the at least one wheel brake caliper for blending a non-hydraulic braking torque, for example a generator braking torque. It is thus ensurable that the plunger is able to remove just enough volume from the braking system that is necessary for reducing the hydraulic braking torque of the at least one wheel brake caliper for a blending operation.

A volume capacity V that is sufficient to reduce the brake pressure in the at least one wheel brake caliper may thus be provided with the aid of the plunger.

Thus, by receiving brake fluid, i.e., by increasing actual fill level F, beginning at point in time t2 the plunger may reduce the hydraulic braking torque of the at least one wheel brake caliper to zero until point in time t3. Beginning at point in time t3, the brake pressure prevailing in the at least one wheel brake caliper prior to the blending may be built up again until point in time t4 by pushing back the volume of brake fluid received for the blending. An overall braking torque predefined by the driver may thus be maintained despite a decrease over time of the non-hydraulic braking torque, for example a generator braking torque, by returning the volume of brake fluid received for the blending back into the braking system.

FIG. 2c represents the pressure-distance characteristic at the master brake cylinder, which is changed by emptying the plunger at a brake activation distance s between zero and first limiting brake activation distance s1. The abscissa of the coordinate system in FIG. 2c indicates the brake activation distance (in mm), while the ordinate of the coordinate system in FIG. 2c corresponds to pressure p (in bar) prevailing in the master brake cylinder. Brake activation distance-pressure characteristic curve p1 which is achievable with the aid of the method described herein is compared to a brake activation distance-pressure characteristic curve p0 of a conventional procedure.

Carrying out the method described herein results in a greater slope of brake activation distance-pressure characteristic curve p1. A higher brake pressure may thus be built up more quickly in the master brake cylinder, or in the at least one wheel brake caliper, with the aid of the method described herein. The method described herein may thus bring about additional brake boosting.

With the aid of the elasticities which are formable in the braking system, brake activation distance-pressure characteristic curve p1 may optionally also be easily adapted to conventional brake activation distance-pressure characteristic curve p0. Since the formation of the elasticities which are suitable for this purpose is not the subject matter of the method described herein, no further detailed information is provided.

As a supplement to carrying out the method in FIGS. 2a through 2c, the plunger may also be equipped with a lock or a blocking valve. In this case, the plunger itself does not have to be able to withstand high pressures, and may therefore be designed with a less stringent performance requirement. Due to the lower probability of a high volume loss as a result of carrying out the method in FIGS. 2a through 2c, the lock may be designed for less stringent safety requirements. It is thus possible to use inexpensive mechanisms for the lock or the blocking valve.

FIGS. 3a through 3d show four coordinate systems for explaining a second exemplary embodiment of the method for operating a braking system.

Figure 3A:
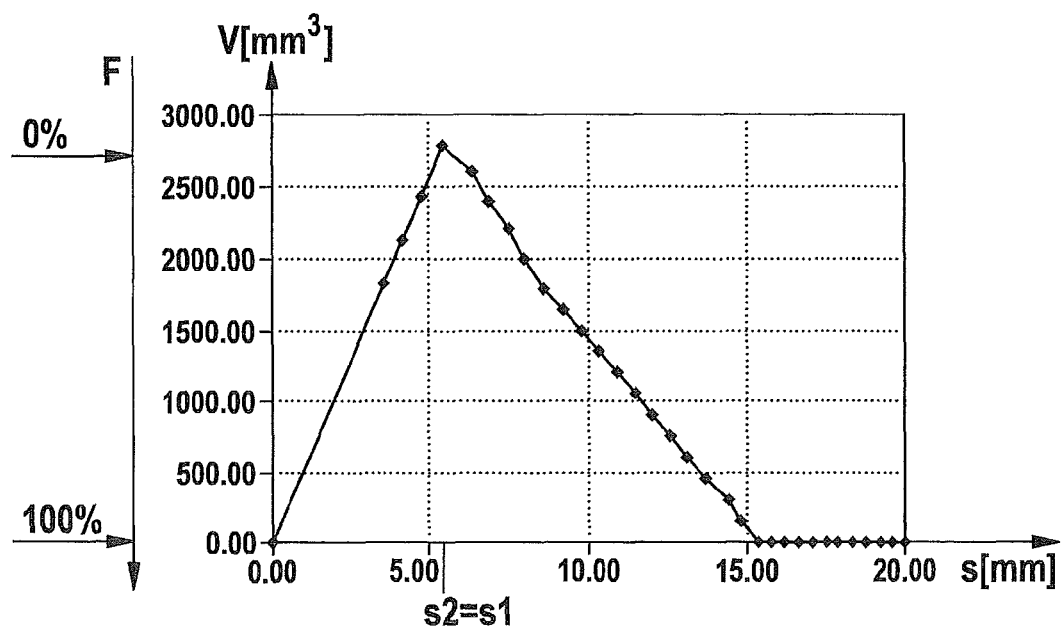
FIGS. 3a through 3d show four coordinate systems for explaining a second exemplary embodiment of the method for operating a braking system.

The abscissa of the coordinate system in FIG. 3a indicates brake activation distance s (input rod travel) in mm. The ordinate of the coordinate system in FIG. 3a corresponds to actual fill level F (in %) and volume capacity V (in mm$^3$).

As a supplement to the above-described method, in the present exemplary embodiment, for a brake activation distance s between a predefined second limiting brake activation distance s2 and a predefined third limiting brake activation distance s3, second limiting brake activation distance s2 being greater than or equal to first brake activation distance s1, the setpoint fill level variable is determined as a continuously increasing function of brake activation distance s/the brake activation intensity variable. In other words, for an increasing deceleration input between a brake activation distance s, which is equal to zero, and first limiting brake activation distance s1, the plunger delivers additional liquid into the braking system, while the plunger is refilled beginning with second limiting brake activation distance s2. As a result, the plunger reliably withstands high pressures in the braking system which may occur beginning with the second limiting brake activation distance, even if at least one of the components of the plunger is functionally impaired. Thus, it is also not necessary to equip the plunger with a lock in order to withstand high pressures.

Figure 3B:
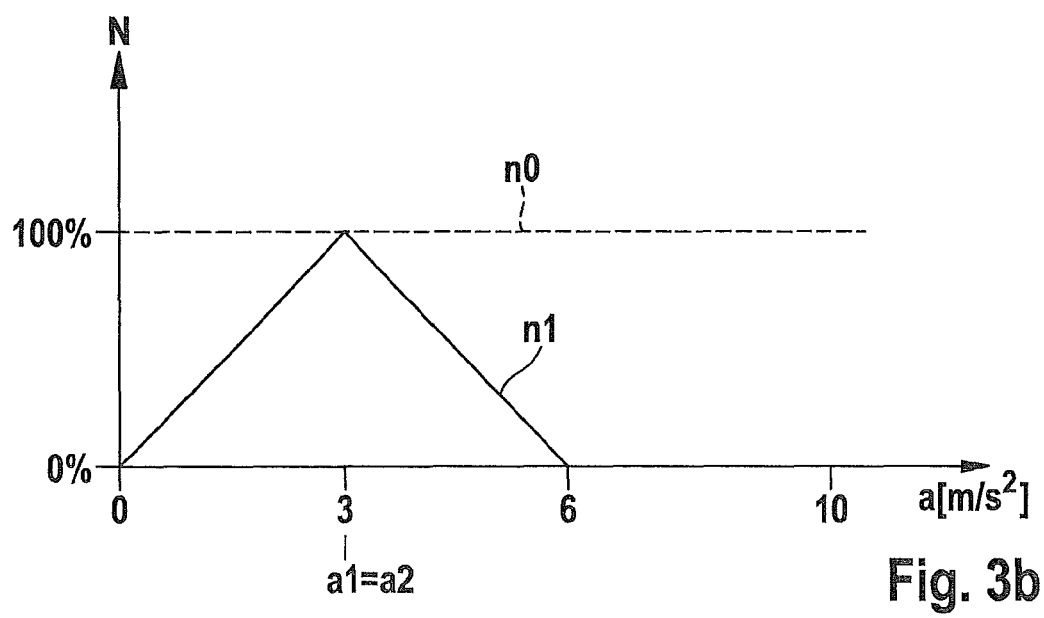

As a result of the control concept of the plunger which is achievable with the aid of this method, the level and the probability of lengthening of a pedal distance due to a functional impairment of at least one component of the plunger may be reduced. This is explained below with reference to FIG. 3b:

In the coordinate system in FIG. 3b, the abscissa is a deceleration a which is brought about by the braking system (negative acceleration, for example overall deceleration), in m/s$^2$, and the ordinate is a volume loss N in %.

Solid-line graph n1 represents the volume loss when the plunger is operated according to the method described herein. For a deceleration a equal to zero, the plunger is (completely) full. For a deceleration a not equal to zero, a blending starting state of the plunger is controlled as a function of deceleration a. For a deceleration a between zero and a first limiting deceleration a1, the plunger displaces only enough liquid into the braking system as is needed for blending the brake pressure which is built up in the at least one wheel brake caliper.

Beginning at a deceleration a, the plunger is refilled from at least second limiting deceleration a2.

It is thus ensurable that a volume loss N of 100% has to be accepted only for a brake activation distance between first limiting brake activation distance s1 and second limiting brake activation distance s2, or for a deceleration a between first limiting deceleration a1 and second limiting deceleration a2. In contrast, volume loss N may be reduced down to 0% with the aid of the advantageous method, in particular for the frequently occurring decelerations a between zero and one-half the first limiting deceleration a1. Likewise, it is not necessary to accept a volume loss N when the vehicle is strongly braked with a deceleration a>>a2.

Dashed-line graph n0 represents volume loss N in a conventional procedure for operating a plunger in which the plunger is empty prior to a blending operation. Thus, a maximum volume loss N of 100% due to a plunger failure may occur at any deceleration a.

Figure 3C:
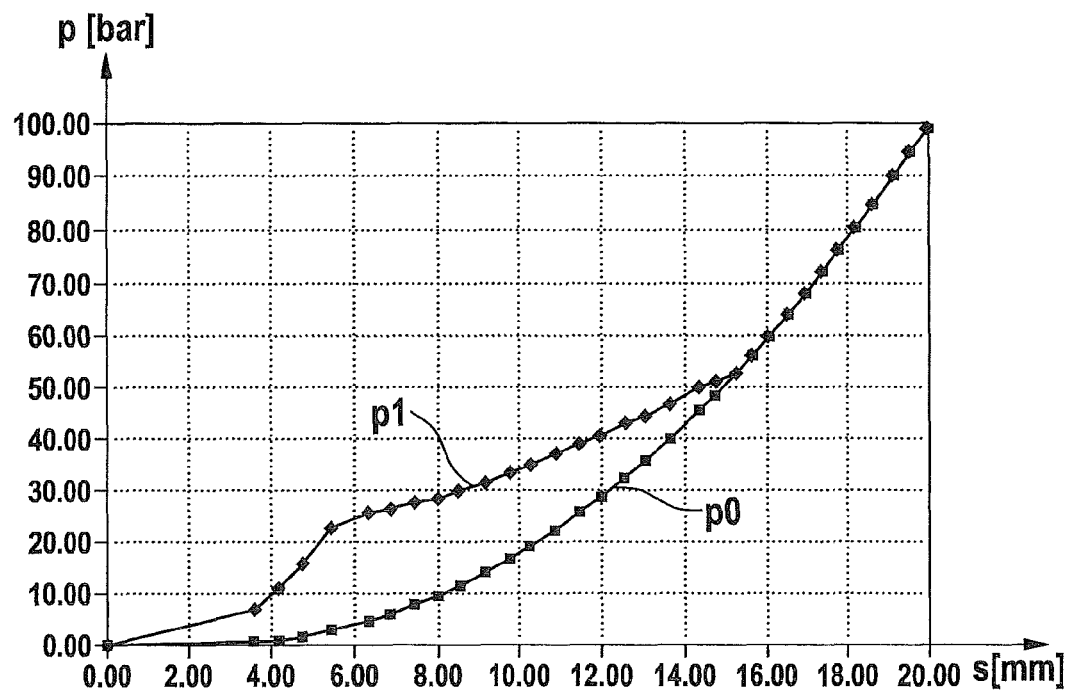

A pressure-distance characteristic brought about with the aid of the method described herein is depicted in FIG. 3c. The abscissa of the coordinate system in FIG. 3c is brake activation distance s (in mm). The ordinate of the coordinate system in FIG. 3c corresponds to pressure p (in bar) prevailing in the master brake cylinder. Brake activation distance-pressure characteristic curve p1 which is achievable with the aid of the method described herein is compared to brake activation distance-pressure characteristic curve p0 of the conventional procedure.

For a small brake activation distance s, brake activation distance-pressure characteristic curve p1 which is achievable with the aid of the method described herein is steeper than brake activation distance-pressure characteristic curve p0 of the conventional procedure. Beginning with the second limiting activation distance, beyond which the plunger is once again controlled in the direction of the 100% fill level, brake activation distance-pressure characteristic curve p1 once again approaches brake activation distance-pressure characteristic curve p0.

Figure 3D:
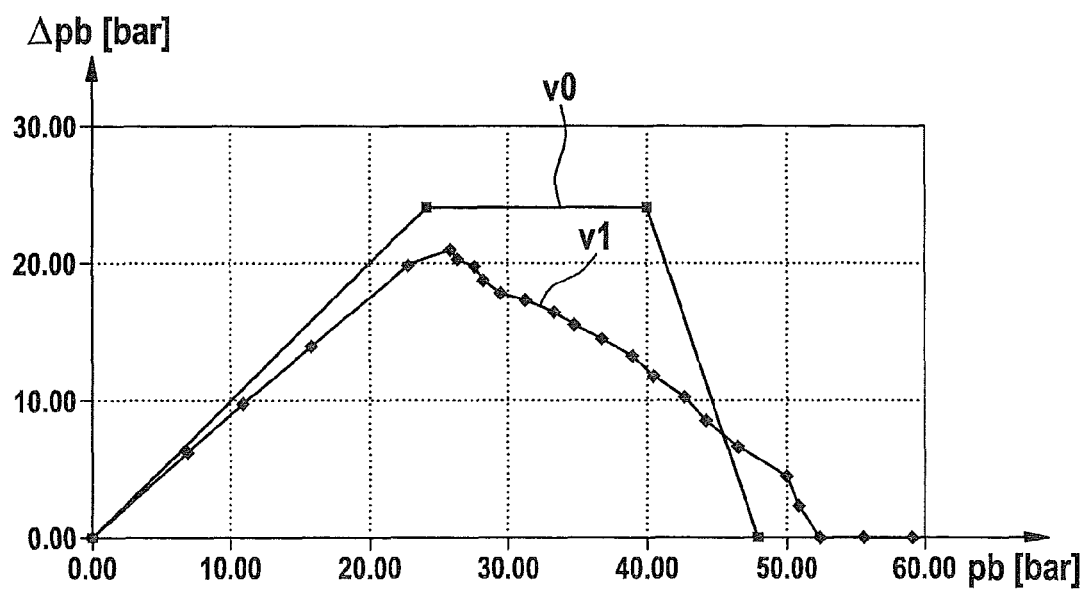

In the coordinate system in FIG. 3d, the abscissa is a brake pressure pb (in bar) that is present in at least one wheel brake caliper, and the ordinate is a maximum pressure reduction Δpb (in bar) that is implementable at a certain brake pressure pb with the aid of the plunger. Graph v1 indicates the pressure reduction that is achievable for the blending in the method described herein, while graph v0 depicts the corresponding values for a conventional procedure.

It is apparent from a comparison of the two graphs v1 and v0 that an advantageous blendability of a generator braking torque is ensured with the aid of the advantageous method described herein, in particular for a low brake pressure pb, i.e., a low vehicle deceleration. This is advantageous since low decelerations frequently have to be carried out primarily in urban traffic. With the aid of the advantageous method described herein, it is thus ensurable that a generator may be used often for quickly charging a vehicle battery.

Figure 4A:
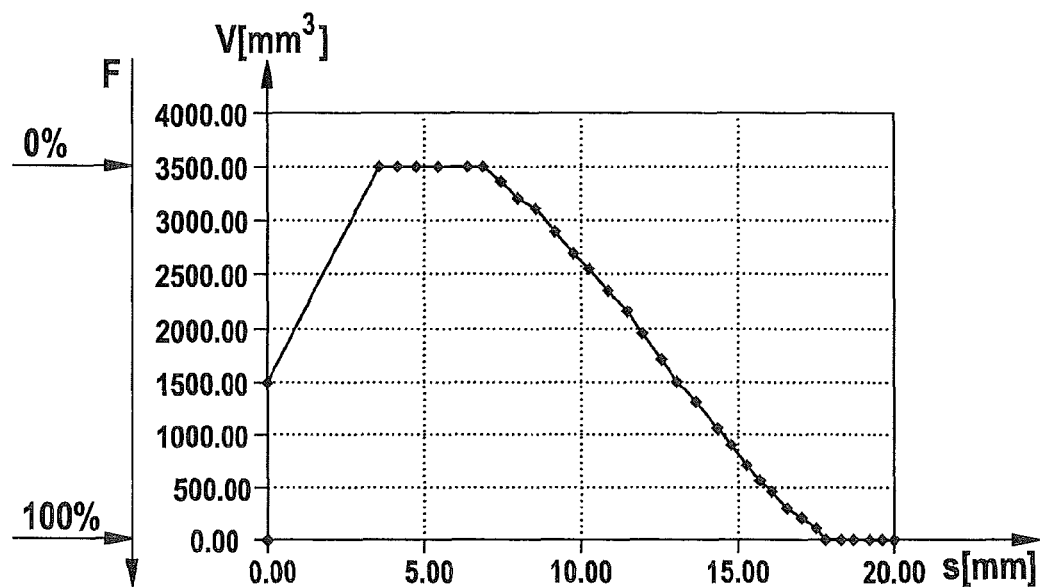
FIGS. 4a through 4c show three coordinate systems for explaining a third exemplary embodiment of the method for operating a braking system.
Figure 4B:
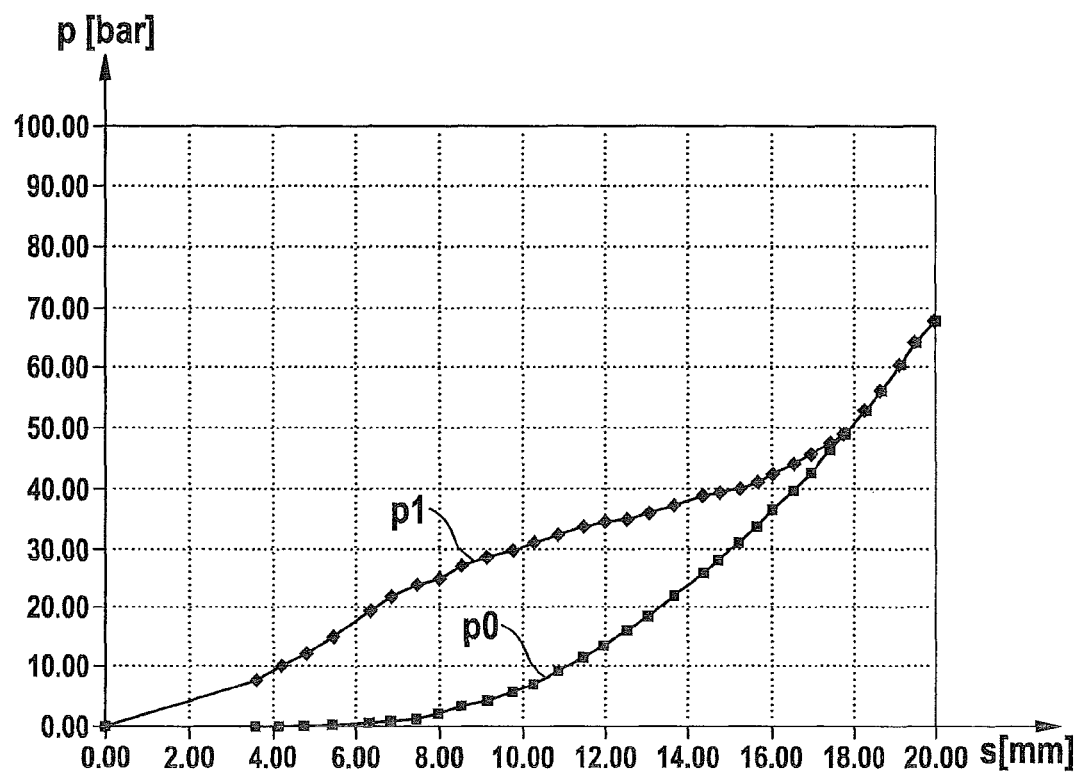
Figure 4C:
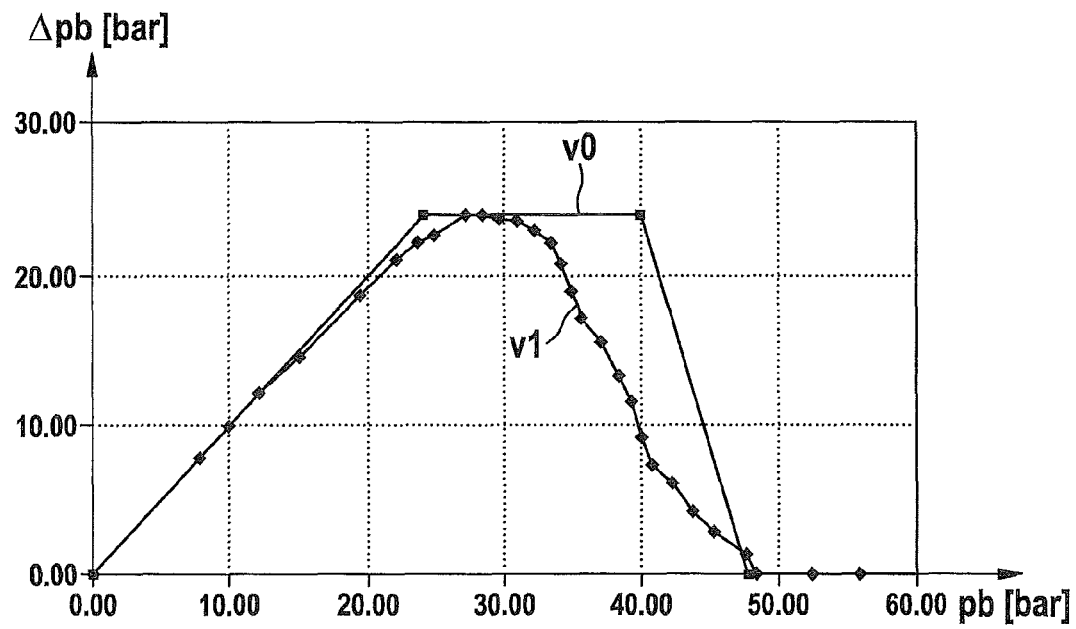

FIGS. 4a through 4c show three coordinate systems for explaining a third exemplary embodiment of the method for operating a braking system.

In the coordinate system in FIG. 4a, the abscissa indicates brake activation distance s (input rod travel) in mm, and the ordinate indicates actual fill level F (in %) and volume capacity V (in mm³).

In the exemplary embodiment of the method described here, second limiting brake activation distance s2 differs from first limiting brake activation distance s1. In addition, for a brake activation distance s equal to zero the plunger is only partially filled, for example to 57%.

In the coordinate system in FIG. 4b, brake activation distance-pressure characteristic curve p1 which is achievable with the aid of the method described herein and brake activation distance-pressure characteristic curve p0 of the conventional procedure are illustrated for comparison, the abscissa indicating the brake activation distance (in mm) and the ordinate indicating pressure p (in bar) prevailing in the master brake cylinder.

As is apparent with reference to FIG. 4b, the pedal characteristic may be set differently by determining limiting brake activation distances s1 and s2, which differ from one another. The pedal characteristic may thus be individually designed via limiting brake activation distances s1 and s2. In particular the non-constant slope of brake activation distance-pressure characteristic curve p1 may be at least partially smoothed by the selection of second limiting brake activation distance s2 (independent of first limiting brake activation distance s1).

In addition, the free pedal travel distance is variably settable via the determination of the values of limiting brake activation distances s1 and s2.

In the coordinate system in FIG. 4c, the abscissa is a brake pressure pb (in bar) that is present in at least one wheel brake caliper, and the ordinate is a maximum pressure reduction Δpb (in bar) that is implementable at a certain brake pressure pb with the aid of the plunger. For comparison, graph v1, which represents the pressure reduction that is achievable in the method described herein, and corresponding graph v0 for the conventional procedure are plotted in the coordinate system in FIG. 4c.

The blending capacity is also freely settable by determining limiting brake activation distances s1 and s2, which differ from one another. For example, a standard blending capacity may be approximated by determining the values for limiting brake activation distances s1 and s2 in graph v1.

Figure 5:
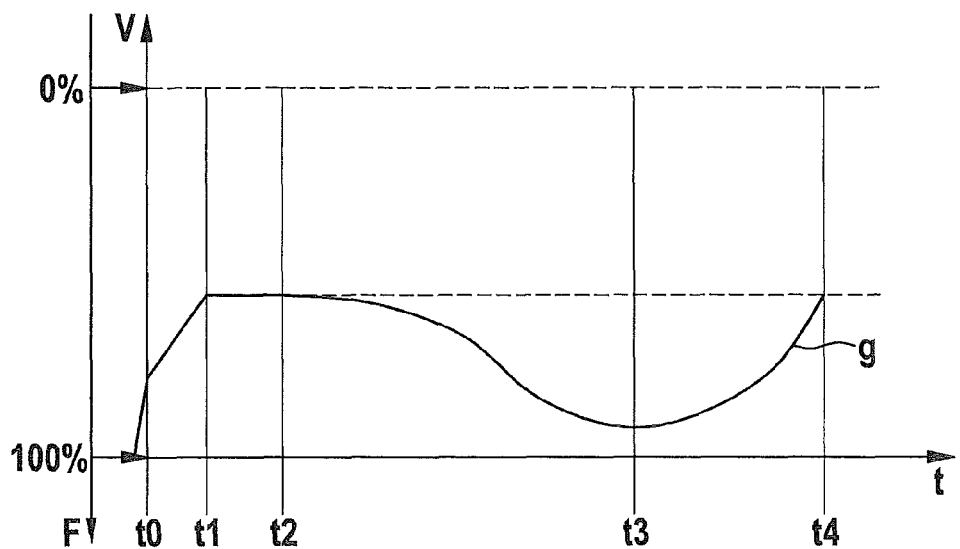
FIG. 5 shows a coordinate system for explaining a fourth exemplary embodiment of the method for operating a braking system.

FIG. 5 shows a coordinate system for explaining a fourth exemplary embodiment of the method for operating a braking system.

The abscissa of the coordinate system in FIG. 5 is time axis t. The ordinate of the coordinate system in FIG. 5 indicates actual fill level F of the plunger (in %) and volume capacity V (in mm³) that is fillable into the plunger. The method described below is depicted by graph g.

The brake activation element may be the brake pedal, for example. When the brake activation element is not activated, until point in time t0 the plunger is almost or completely filled with brake fluid. However, even during a change from an accelerator pedal to the brake activation element, an initial state in the plunger may be set in which the plunger is preferably present at/around point in time t0. For setting the initial state, the plunger is preferably adjusted from an accelerator pedal activation fill level to the setpoint fill level of the initial state by slightly emptying the plunger. The setpoint fill level of the initial state may be set to a value of at least 20%, taking into account at least one provided brake activation intensity variable and/or a provided generator usability, such as a change time between the accelerator pedal activation and the brake pedal activation, a speed of the brake pedal activation, a vehicle speed, an available generator braking torque, a state of charge of a battery, and/or a preferred regeneration mode, in particular selected from at least one comfort mode and a maximum regeneration mode.

During the activation of the brake activation element by the driver between points in time t0 and t1, the blending start position of the plunger is tracked as a function of a level of the driver braking input. The additional variables described above may also be taken into account for determining the blending start position. For reducing a brake pressure by the plunger for a blending operation, the plunger is still able to remove a sufficient volume of brake fluid from the braking system despite a setting of the initial position, i.e., the blending start position. A preferred overall braking torque may be maintained by supplying brake fluid via the plunger, despite a decrease over time of the braking torque to be blended. Reference is made to the description for FIG. 2b with regard to further method steps which may be carried out.

Figure 6A:
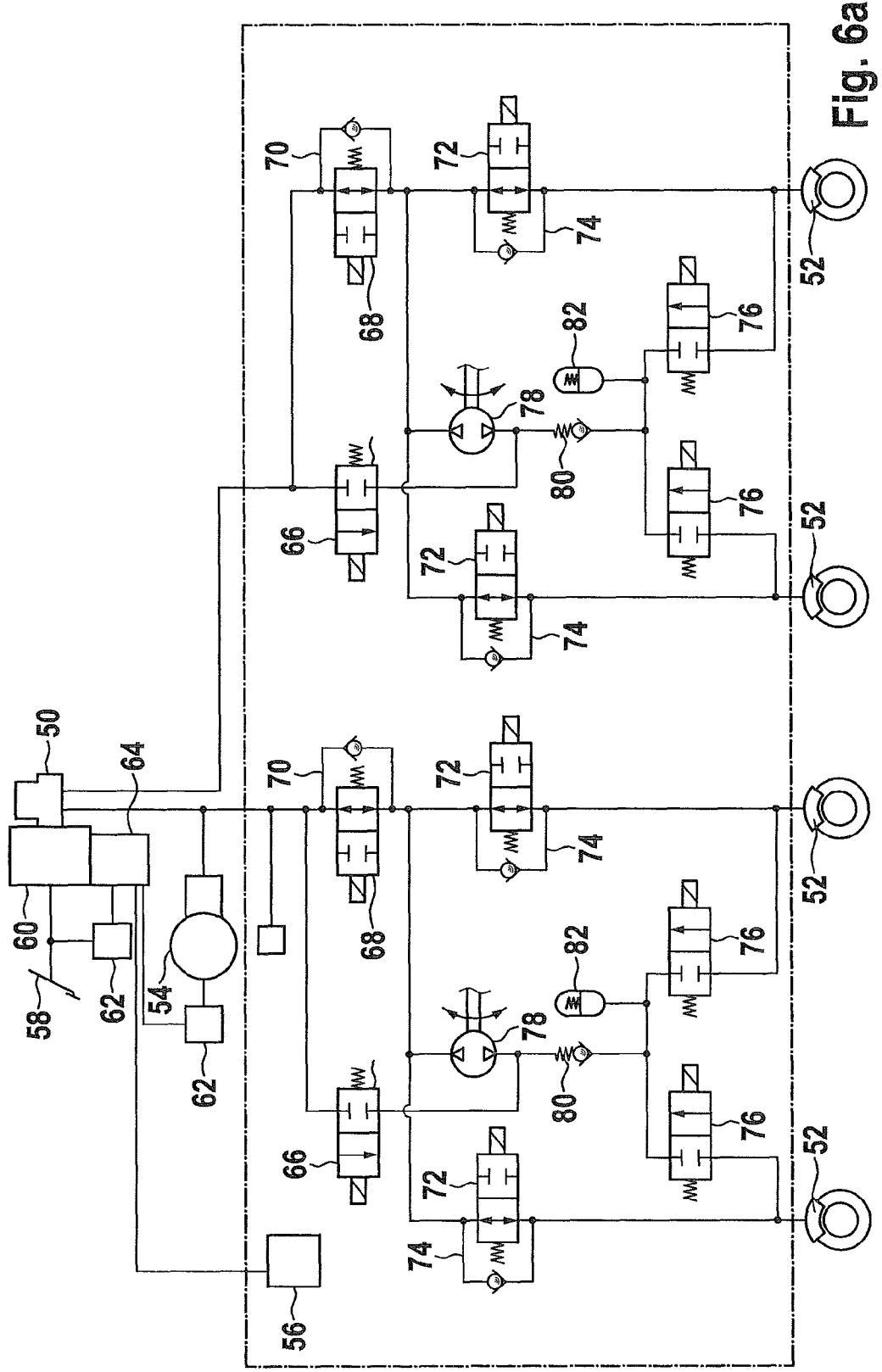
FIGS. 6a and 6b respectively show a schematic overview illustration of one exemplary embodiment of the braking system and a coordinate system for explaining a fifth exemplary embodiment of the method for operating a braking system.
Figure 6B:
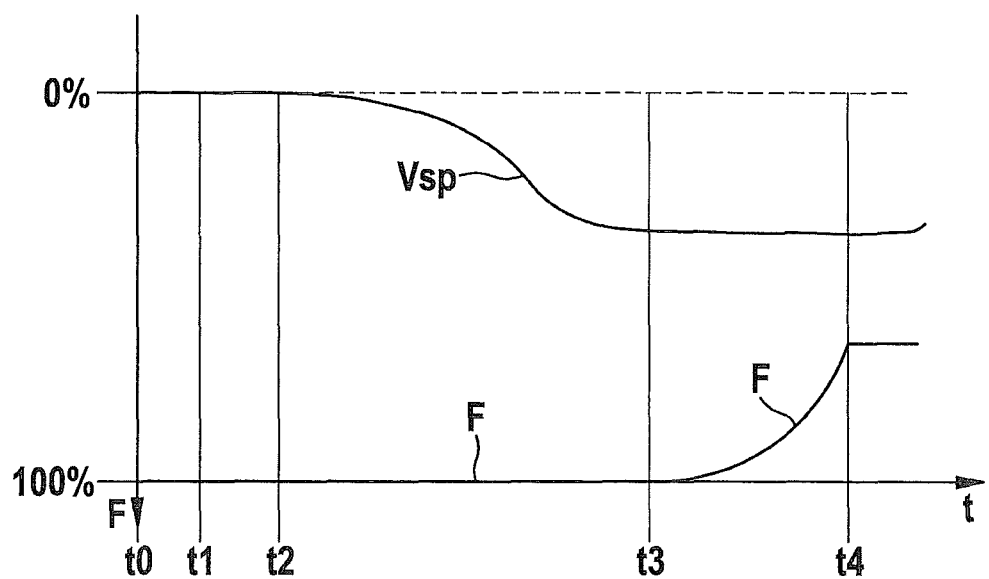

FIGS. 6a and 6b respectively show a schematic overview illustration of one exemplary embodiment of the braking system and a coordinate system for explaining a fifth exemplary embodiment of the method for operating a braking system.

The braking system for a vehicle schematically depicted in FIG. 6a has a master brake cylinder 50, at least one wheel brake caliper 52 which is hydraulically connected to master brake cylinder 50, at least one plunger 54 which is hydraulically connected to the at least one wheel brake caliper 52, and a control device 56, as described above. A brake activation element 58 which is designed as a brake pedal, for example, is also optionally situated at master brake cylinder 50. Via a brake booster 60, the driver may be relieved from exerting force in braking master brake cylinder 50 by activating brake activation element 58. At least one brake activation intensity sensor 62 is also preferably situated at brake activation element 58 which may output a sensor signal concerning the brake activation intensity to control device 56 and/or to a brake booster control device 64. The at least one brake activation intensity sensor 62 may be a rod travel sensor and/or a force sensor, for example.

The braking system which is operable with the aid of the method described herein is not limited to a certain number of wheel brake calipers 52 or brake circuits. Likewise, the operable braking system is not limited to a specific design of the at least one brake circuit or to a required provision of the at least one brake circuit with a high-pressure switching valve 66, a switchover valve 68 having a bypass line 70 extending parallel thereto and a check valve, at least one wheel inlet valve 72 having a bypass line 74 extending parallel thereto and a check valve, at least one wheel outlet valve 76, a pump 78, and a spring check valve 80 situated between at least one wheel outlet valve 76 and a pump 78. For carrying out the exemplary embodiment of the method described here, it is only assumed that the braking system is equipped with at least one storage chamber 82, in addition to plunger 54. (However, it is pointed out that other embodiments of the method described herein may also be carried out without this type of storage chamber 82.) Considerable degrees of freedom exist with regard to the arrangement of the at least one storage chamber 82 in the braking system and the design of the at least one storage chamber 82.

The exemplary embodiment of the method described herein is depicted with reference to the coordinate system in FIG. 6b. The abscissa shows time axis t, and the ordinate shows actual fill level F of plunger 54 and actual storage volume Vsp of the at least one storage chamber 82.

Prior to and after an activation of brake activation element 58, plunger 54 is at least partially filled, preferably filled to at least 20%, for example to 50%, in particular to 100%. Neither the increase in the brake activation intensity between times t0 and t1 nor maintaining the brake activation intensity constant between times t1 and t2 influences actual fill level F of plunger 54. The at least one storage chamber 82 is preferably in an empty state between points in time t0 and t2.

Beginning at point in time t2, a braking torque to be blended increases. To maintain an overall braking torque predefined by the driver despite the increase in the braking torque to be blended, the at least one storage chamber 82 is used to reduce a brake pressure in the at least one wheel brake caliper 52. For this purpose, brake fluid is discharged into the at least one storage chamber 82. For example, the at least one wheel outlet valve 76, if present, may be designed for a controlled discharge of brake fluid into storage chamber 82. To maintain a set brake pressure, in this case the at least one wheel outlet valve 76 may be re-closed.

In other words, when the braking torque to be blended increases over time, a setpoint intake volume of the at least one storage chamber 82 of the braking system, corresponding to the increase over time, is determined, and the at least one storage chamber 82 is controlled for drawing in an actual intake volume corresponding to the setpoint intake volume, or for a corresponding actual storage volume Vsp. For this purpose, at least one storage chamber 82 of the ESP system may be used. The method may thus generally be carried out with the aid of a component that is already present in a braking system.

To blend a decrease over time of the braking torque to be blended, beginning at point in time t3, brake pressure is built up in the at least one wheel brake caliper 52 with the aid of plunger 54. Although pumping out brake fluid from the at least one storage chamber 82 may possibly cause pulsations which may be perceptible to the driver as vibration/shaking/recoil of brake activation element 58, the brake pressure buildup which occurs between points in time t3 and t4 with the aid of plunger 54 is imperceptible to the driver. In addition, for an increase over time of the braking torque to be blended after point in time t4, brake fluid may be filled into plunger 54 until it is once again 100% full.

Figure 7A:
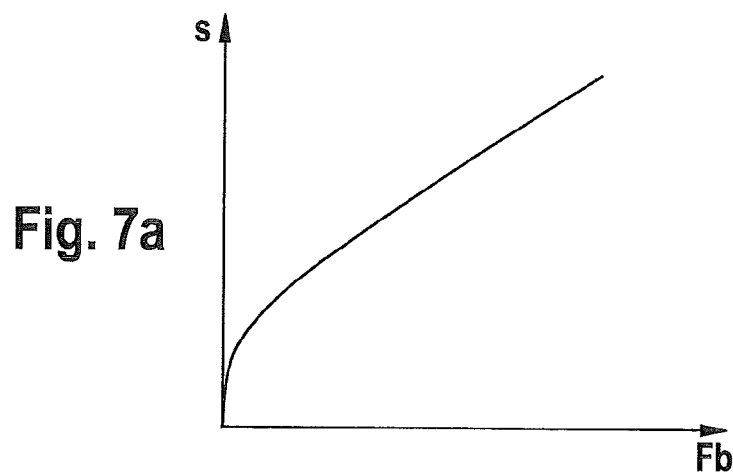
FIGS. 7a through 7c show three coordinate systems for explaining a sixth exemplary embodiment of the method for operating a braking system.
Figure 7B:
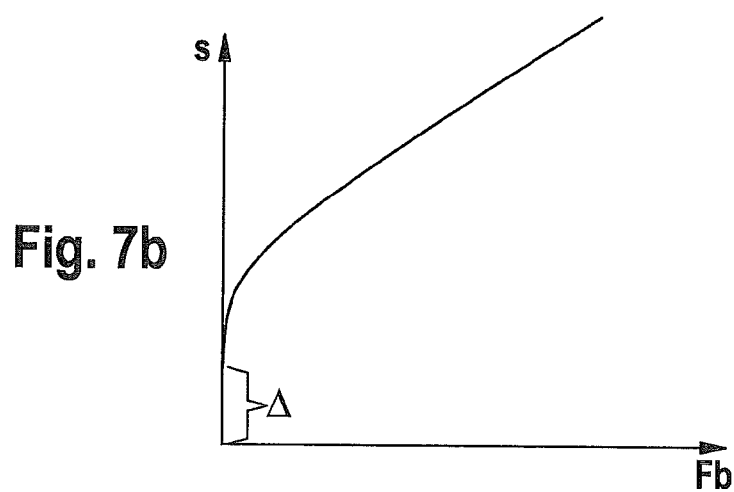
Figure 7C:
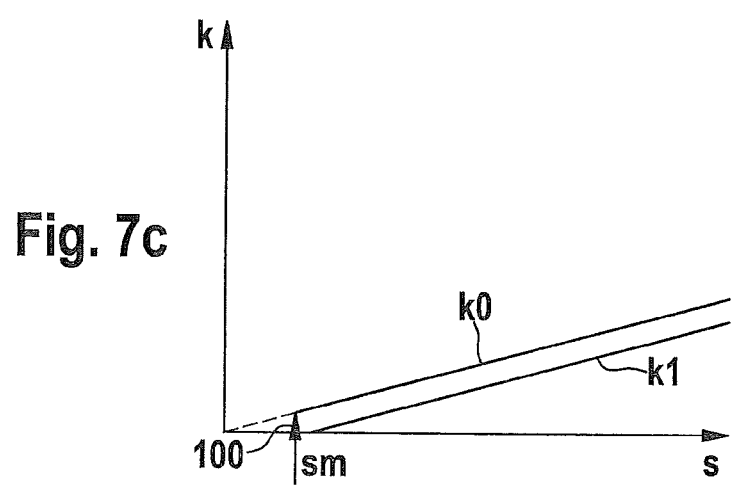

FIGS. 7a through 7c show three coordinate systems for explaining a sixth exemplary embodiment of the method for operating a braking system.

In the coordinate systems of FIGS. 7a and 7b, the ordinates are a brake activation distance s and the abscissas are a braking force Fb, thus brought about, for braking at least one brake caliper of the braking system.

FIGS. 7a and 7b illustrate an influence of a centrifugal force, which acts on the vehicle, on the brake activation distance-braking force characteristic of the braking system. FIG. 7a shows the brake activation distance-braking force characteristic prior to driving the vehicle equipped with the braking system around a sharp curve. In contrast, FIG. 7b illustrates the brake activation distance-braking force characteristic after driving the vehicle around the sharp curve. As is apparent from a comparison of FIGS. 7a and 7b, after driving around the sharp curve an additional brake activation distance/a cornering-related free travel Δ must be overcome in order to exert a braking force. It is pointed out that no brake pressure is built up, i.e., no braking force is exerted on the associated wheel, during the additional brake activation distance/cornering-related free travel Δ.

Cornering-related free travel Δ may be attributed to the fact that while driving around a sharp curve, displacements/shifts within at least one component of the braking system occur due to the acting centrifugal force. For example, at least one piston in the at least one wheel brake caliper may be shifted as a result of the centrifugal force. As a result, for example, the particular piston may have to be displaced a greater distance before contact between the brake shoes and the rotor is established.

This effect may also be referred to as "knock-back." Air play while driving around a curve is in particular responsible for the knock-back, in which, for example, the piston of the brake caliper is shifted as a result of the centrifugal force. In addition, seal expansions may occur due to age and/or frequent activation. Likewise, a seal expansion and/or a loss of friction torque may occur at at least one brake caliper while driving around a curve.

With the aid of the method described herein, it is possible to eliminate this effect, referred to as knock-back, which occurs in particular when driving around a sharp curve, and thus, to suppress cornering-related free travel Δ despite frequent driving around sharp curves.

To carry out the method, a master brake cylinder internal pressure and a wheel brake pressure in at least one wheel brake caliper may be ascertained and evaluated, preferably after closing at least one pressure balancing opening in the master brake cylinder, such as a balancing bore. If an imbalance between the increase in the master brake cylinder internal pressure and the increase in the wheel brake pressure is determined, the knock-back may be subsequently eliminated by displacing a volume from the already prefilled plunger into the at least one wheel brake caliper.

Alternatively or additionally, a progression of the change in travel direction may be evaluated to identify a possible occurrence of a knock-back and quickly compensate for same if necessary. For example, a change in travel direction of a vehicle equipped with the operated braking system may be checked for an exceedance of a predefined comparative angle variable. If no exceedance of the predefined comparative angle variable is ascertained, for the next brake activation intensity which differs from the non-activation intensity, a first fill level may be determined as the setpoint fill level variable, taking the brake activation intensity into account. After an exceedance of the predefined comparative angle variable, for the next brake activation intensity which differs from the non-activation intensity, a second fill level which is less than the first fill level may be determined as the setpoint fill level variable, taking the brake activation intensity into account. By reducing the setpoint fill level after driving around at least one sharp curve, an additional volume of brake fluid is displaced from the plunger into the at least one wheel brake caliper. An additional pressure may thus be exerted in particular on the displaceable piston of the wheel brake caliper. With the aid of this pressure, the piston may be returned, for example, to its starting position which it occupied prior to driving around the sharp curve. This is graphically illustrated with reference to FIG. 7c.

In the coordinate system in FIG. 7c, the abscissa is brake activation distance s and the ordinate is piston travel k of a brake caliper piston. Graph k0 represents a brake activation distance-piston travel relation prior to driving a vehicle around a sharp curve. In contrast, graph k1 illustrates a brake activation distance-piston travel relation after driving a vehicle around the sharp curve, provided that the above-described method is not carried out to prevent cornering-related free travel Δ.

Piston travel k is directly proportional to brake activation distance s in both brake activation distance-piston travel relations k0 and k1. However, brake activation distance-piston travel relation k1 has a distinct delay in the increase of piston travel k beyond zero, despite a minimum brake activation distance sm which is not equal to zero.

With the aid of the above-described method for preventing cornering-related free travel Δ, already up to minimum brake activation distance sm, an additional volume of brake fluid may be displaced from the controlled plunger into the at least one wheel brake caliper by reducing the actual fill level of the plunger. As depicted by arrow 100, advantageous brake activation distance-piston travel relation k0 may thus be brought about despite driving around at least one sharp curve. With the aid of the above-described method, the input rod travel/pedal travel which would otherwise be lost may be eliminated, even without feedback from the driver. After overcoming the "jump-in" area, the driver also has the same feedback from his braking system as for conventional operation of the braking system.

It is pointed out that the exemplary embodiment of the method described herein may be carried out in a braking system without having to make structural changes to the braking system.

Figure 8A:
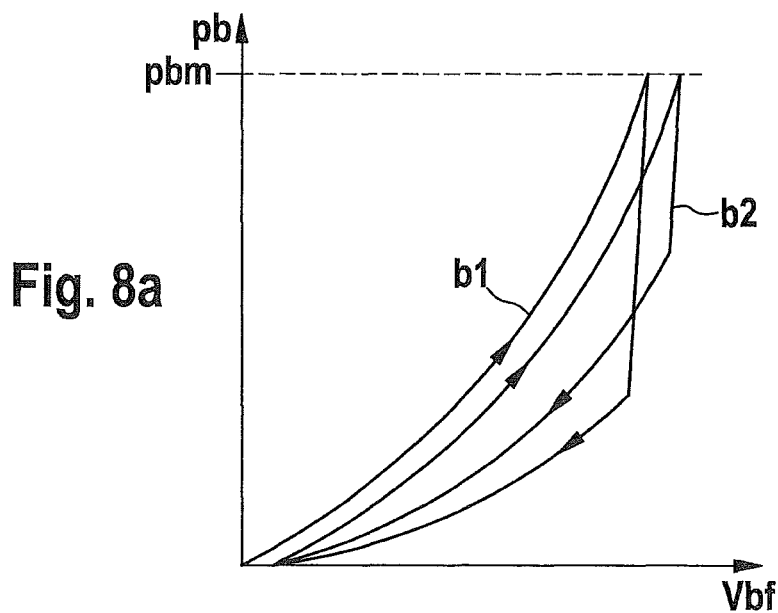
FIGS. 8a through 8c show three coordinate systems for explaining a seventh exemplary embodiment of the method for operating a braking system.
Figure 8B:
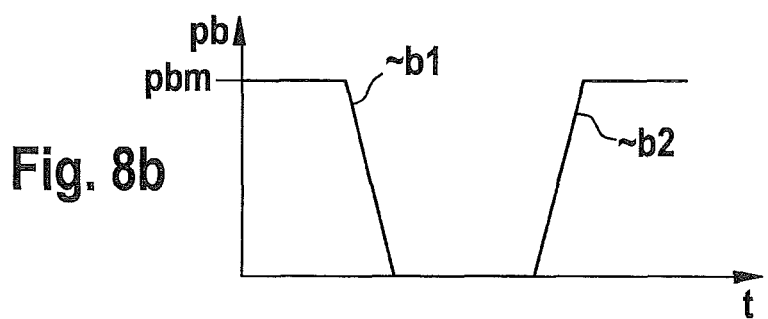
Figure 8C:
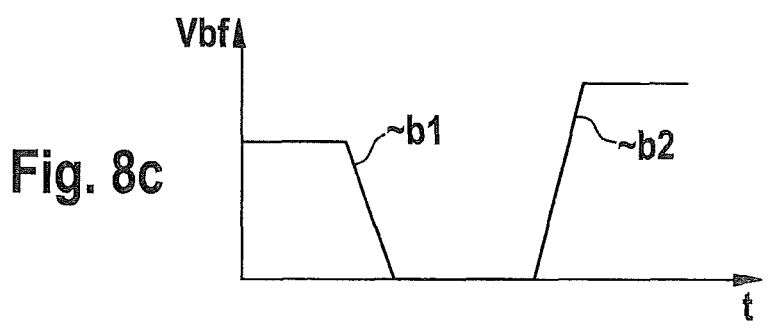

FIGS. 8a through 8c show three coordinate systems for explaining a seventh exemplary embodiment of the method for operating a braking system.

In the coordinate system in FIG. 8a, the abscissa represents a (brake fluid) volume Vbf which is displaced during a brake activation, while the ordinate depicts brake pressure pb which is built up in this way. A minimum brake pressure pbm is to be achieved during a first braking operation (having p-V characteristic curve b1) as well as during a second braking operation (having p-V characteristic curve b2). The variations over time of brake pressure pb and of displaced volume Vbf are illustrated in the coordinate systems in FIGS. 8b and 8c, in which the abscissas are time axis t.

It is apparent from an observation of the characteristic illustrated in FIG. 8a that the p-V characteristic curve of the braking system changes upon multiple pressure modulations.

For example, a compression at the seals and/or brake linings may be responsible for the change in the p-V characteristic curve. An additional free travel may arise in this way. Thus, during extended operation of the braking system without complete release of the pedal (no back-suction of liquid, for example during a strong fluctuation in the generator braking torque, as the result of which a large amount of pressure is frequently modulated), typically more volume is necessary to set the brake pressure to desired minimum brake pressure pbm.

However, the method described herein implements an operating strategy in which the plunger is at least partially filled at the start of a pressure modulation. Thus, prior to the start of a pressure modulation the plunger always contains a sufficient volume of brake fluid to compensate for signs of wear on the braking system by delivering additional brake fluid into the at least one wheel brake caliper.

In the method, a duration and/or an intensity of a use of the plunger/braking system is/are checked for an exceedance of a predefined comparative use intensity variable. If no exceedance of the predefined comparative use intensity variable is ascertained, for the next brake activation intensity which differs from the non-activation intensity a third fill level may be determined as the setpoint fill level, taking the brake activation intensity into account. In contrast, after an exceedance of the predefined comparative use intensity variable, for the next brake activation intensity which differs from the non-activation intensity, a fourth fill level which is less than the third fill level may be determined as the setpoint fill level, taking the brake activation intensity into account. By reducing the actual fill level, an additional volume of brake fluid is automatically delivered into the wheel brake calipers to compensate for signs of wear on the braking system. In this way, a reliable functional performance of the braking system is ensured, even after it has been operated for an extended period of time.

It is pointed out that all methods described herein may be carried out using a plunger 54 which is inexpensive and requires little installation space. Thus, the technology according to the present invention may be used for reducing the costs and the required installation space of a plunger which cooperates with a braking system. In addition, a gear having a high efficiency may be used for the plunger with the aid of the technology according to the present invention described herein.

What is claimed is:

1. A control device for a braking system of a vehicle, comprising:
   a first receiving device, with which a provided brake activation intensity variable concerning an activation intensity of an activation of a brake activation element situated on the braking system is receivable; and
   a plunger control device, with which a setpoint fill level variable of a plunger is determinable, taking into account at least the received brake activation intensity variable, and a plunger control signal corresponding to the determined setpoint fill level variable is outputtable to the plunger, so that a ratio of an actual volume of liquid that is filled into a storage volume of the plunger and a maximum volume that is fillable into the storage volume is settable corresponding to the determined setpoint fill level variable;
   wherein for a brake activation intensity variable corresponding to a predefined non-activation intensity variable, the plunger control device is designed to determine a fill level variable which differs from an empty state of the plunger as the setpoint fill level variable, and to output a plunger control signal corresponding to the determined setpoint fill level variable to the plunger such that the plunger is at least partially filled.

2. The control device according to claim 1, wherein, for a brake activation intensity variable corresponding to the non-activation intensity variable, the plunger control device is designed to determine a fill level variable of at least 20% as the setpoint fill level variable, and to output a plunger control signal corresponding to the determined fill level variable to the plunger, such that the actual volume of liquid that is filled into the storage volume is settable to at least 20% of the maximum volume.

3. The control device according to claim 2, wherein for a brake activation intensity variable corresponding to the non-activation intensity variable, the plunger control device is designed to determine a fill level variable of at least 50% as the setpoint fill level variable, and to output a plunger control signal corresponding to the determined fill level variable to the plunger, such that the actual volume of liquid that is filled into the storage volume is settable to at least 50% of the maximum volume.

4. The control device according to claim 3, wherein for a brake activation intensity variable corresponding to the non-activation intensity variable, the plunger control device is designed to determine a fill level variable of at least 70% as the setpoint fill level variable.

5. The control device according to claim 4, wherein for a brake activation intensity variable corresponding to the non-activation intensity variable, the plunger control device is designed to determine a fill level variable of at least 90% as the setpoint fill level variable.

6. The control device according to claim 1, wherein for a brake activation intensity variable between the non-activation intensity variable and a predefined first limiting activation intensity variable, the plunger control device is also designed to determine the setpoint fill level variable as a continuously decreasing function of the brake activation intensity variable.

7. The control device according to claim 6, wherein for a brake activation intensity variable between a predefined second limiting activation intensity variable, which is greater than or equal to the first limiting activation intensity variable, and a predefined third limiting activation intensity variable, the plunger control device is also designed to determine the setpoint fill level variable as a continuously increasing function of the brake activation intensity variable.

8. The control device according to claim 1, wherein the control device includes a second receiving device, with which a provided blending variable concerning a change over time of a braking torque to be blended is receivable, and the plunger control device is also designed to reduce the setpoint fill level variable when the braking torque to be blended decreases over time.

9. The control device according to claim 8, wherein the plunger control device is also designed to increase the setpoint fill level variable when there is an increase over time of the braking torque to be blended, or to determine a setpoint intake volume of a storage chamber of the braking system corresponding to the increase over time, and to output a storage control signal, which corresponds to the setpoint intake volume, to a control unit of the storage chamber.

10. The control device according to claim 1, wherein the control device includes a third receiving device, with which a provided change of travel direction variable concerning a change of direction of travel of a vehicle equipped with the control device is receivable, and the plunger control device is also designed to compare the received change of travel direction variable to at least one predefined comparative angle variable, and for a brake activation intensity variable which differs from the non-activation intensity variable, if the change of travel direction variable is less than the comparative angle variable, to determine a first fill level variable as the setpoint fill level variable, taking the brake activation intensity variable into account, and if the change of travel direction variable is greater than the comparative angle variable, to determine a second fill level variable which is less than the first fill level variable as the setpoint fill level variable, taking the brake activation intensity variable into account.

11. The control device according to claim 1, wherein the control device includes a fourth receiving device, with which a provided use intensity variable concerning at least one of a duration and an intensity of a use of at least one of the plunger and the braking system is receivable, and the plunger control device is also designed to compare the received use intensity variable to at least one predefined comparative use intensity variable, and for a brake activation intensity variable which differs from the non-activation intensity variable, if the use intensity variable is less than the comparative use intensity variable, to determine a third fill level variable as the setpoint fill level variable, taking the brake activation intensity variable into account, and if the use intensity variable is greater than the comparative use intensity variable, to determine a fourth fill level variable which is less than the third fill level variable as the setpoint fill level variable, taking the brake activation intensity variable into account.

12. A braking system for a vehicle, comprising:
   a master brake cylinder;
   at least one wheel brake caliper which is hydraulically connected to the master brake cylinder;
   at least one plunger which is hydraulically connected to the at least one wheel brake caliper; and
   the control device according to claim 1.

13. A method for operating a braking system of a vehicle, comprising:
   determining a setpoint fill level of a plunger, taking into account at least one activation intensity of an activation of a brake activation element situated on the braking system;
   controlling the plunger corresponding to the determined setpoint fill level so that a ratio of an actual volume of liquid that is filled into a storage volume of the plunger and a maximum volume that is fillable into the storage volume is set corresponding to the determined setpoint fill level;

comparing the brake activation intensity to a predefined non-activation intensity;

if the brake activation intensity corresponds to the non-activation intensity, determining a fill level which differs from an empty state of the plunger as the setpoint fill level; and controlling the plunger corresponding to the determined fill level so that the plunger is at least partially filled.

14. The method according to claim 13, wherein a fill level of at least 50% is determined as the setpoint fill level, and the plunger is controlled, corresponding to the determined fill level of at least 50%, in such a way that the actual volume of liquid that is filled into the storage volume is set to at least 50% of the maximum volume.

15. The method according to claim 13, wherein for a brake activation intensity between the non-activation intensity and a predefined first limiting activation intensity, the setpoint fill level is determined as a continuously decreasing function of the brake activation intensity, and for a brake activation intensity between a predefined second limiting activation intensity, which is greater than or equal to the first limiting activation intensity, and a predefined third limiting activation intensity, the setpoint fill level is determined as a continuously increasing function of the brake activation intensity.

16. The method according to claim 13, wherein a change over time of a braking torque to be blended is ascertained, and the setpoint fill level is reduced when the braking torque to be blended decreases over time, and when there is an increase over time of the braking torque to be blended, a setpoint intake volume of a storage chamber of the braking system corresponding to the increase over time is determined, and the storage chamber is controlled to draw in an actual intake volume which corresponds to the setpoint intake volume.

17. The method according to claim 13, wherein an exceedance of a predefined comparative angle variable is checked upon a change in travel direction of a vehicle, and if no exceedance of the predefined comparative angle variable is ascertained, for the next brake activation intensity which differs from the non-activation intensity, a first fill level is determined as the setpoint fill level, taking the brake activation intensity into account, and after an exceedance of the predefined comparative angle variable, for the next brake activation intensity which differs from the non-activation intensity, a second fill level which is less than the first fill level is determined as the setpoint fill level, taking the brake activation intensity into account.

18. The method according to claim 13, wherein an exceedance of a predefined comparative use intensity variable due to at least one of a duration and an intensity of a use of at least one of the plunger and of the braking system is checked, and if no exceedance of the predefined comparative use intensity variable is ascertained, for the next brake activation intensity which differs from the non-activation intensity, a third fill level is determined as the setpoint fill level, taking the brake activation intensity into account, and after an exceedance of the predefined comparative use intensity variable, for the next brake activation intensity which differs from the non-activation intensity, a fourth fill level which is less than the third fill level is determined as the setpoint fill level, taking the brake activation intensity into account.

* * * * *